United States Patent
Bennett

(10) Patent No.: US 9,512,914 B1
(45) Date of Patent: Dec. 6, 2016

(54) DRIVE ASSEMBLY

(71) Applicant: Hydro-Gear Limited Partnership, Sullivan, IL (US)

(72) Inventor: Michael L. Bennett, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 14/684,034

(22) Filed: Apr. 10, 2015

Related U.S. Application Data

(60) Continuation of application No. 14/290,645, filed on May 29, 2014, now Pat. No. 9,003,902, which is a division of application No. 12/853,978, filed on Aug. 10, 2010, now Pat. No. 8,739,905.

(60) Provisional application No. 61/232,616, filed on Aug. 10, 2009.

(51) Int. Cl.
| | |
|---|---|
| *F16H 57/023* | (2012.01) |
| *F16H 57/028* | (2012.01) |
| *F16H 47/02* | (2006.01) |
| *F16H 57/04* | (2010.01) |
| *F16H 57/02* | (2012.01) |

(52) U.S. Cl.
CPC ............ *F16H 57/023* (2013.01); *F16H 47/02* (2013.01); *F16H 57/028* (2013.01); *F16H 57/0424* (2013.01); *F16H 2057/02052* (2013.01); *F16H 2057/02082* (2013.01); *F16H 2057/02086* (2013.01)

(58) Field of Classification Search
CPC .. F16H 57/023; F16H 57/028; F16H 57/0424; F16H 47/02; F16H 2057/02086; F16H 2057/02082;F16H 2057/02052; F16H 61/40; F16H 61/4165; F16H 61/4183
See application file for complete search history.

(56) References Cited

U.S. PATENT DOCUMENTS

| | | |
|---|---|---|
| 1,338,777 A | 5/1920 | Johnson |
| 1,386,396 A | 8/1921 | Cornelison |
| 2,537,060 A | 1/1951 | Keese |
| 2,578,584 A | 12/1951 | Osborn |
| 2,692,516 A | 10/1954 | O'Leary |
| 3,360,933 A | 1/1968 | Swanson et al. |
| 3,424,032 A | 1/1969 | Kaspar |
| 3,435,928 A | 4/1969 | Frederick |

(Continued)

OTHER PUBLICATIONS

"Unpublished U.S. Appl. No. 12/853,978, filed Aug. 10, 2013".
"Unpublished U.S. Appl. No. 13/913,893, filed Jun. 10, 2013".

*Primary Examiner* — Laura Freedman
(74) *Attorney, Agent, or Firm* — Neal, Gerber & Eisenberg LLP

(57) ABSTRACT

A drive assembly is disclosed, with a hydraulic center section for a rotating kit disposed in a housing. A spring is disposed between the center section and an internal surface of the housing. The center section may include a main body having first and second running surfaces and at least one side wall, and internal porting formed in the main body to connect the first running surface with the second running surface. A pair of passages in communication with the internal porting may be formed in a structure having an external surface forming an alignment profile shaped to fit in a first internal housing pocket. A protrusion shaped to fit in second internal housing pocket extends from a side wall of the main body generally opposite to the structure, and the spring may engage the protrusion.

21 Claims, 12 Drawing Sheets

(56) References Cited

U.S. PATENT DOCUMENTS

| | | |
|---|---|---|
| 3,486,335 A | 12/1969 | Richard et al. |
| 3,817,403 A | 6/1974 | Glachet et al. |
| 4,589,249 A | 5/1986 | Walker et al. |
| 4,658,662 A | 4/1987 | Rundle |
| 5,099,936 A | 3/1992 | Irikura et al. |
| 5,201,692 A | 4/1993 | Johnson et al. |
| 5,314,387 A | 5/1994 | Hauser et al. |
| 5,392,670 A | 2/1995 | Hauser |
| 5,540,119 A | 7/1996 | Hudson |
| 5,544,547 A | 8/1996 | Ishimaru |
| 5,697,264 A | 12/1997 | Andrews et al. |
| 5,947,218 A | 9/1999 | Ishimaru |
| 6,098,385 A | 8/2000 | Turk |
| 6,122,996 A | 9/2000 | Hauser et al. |
| 6,266,598 B1 | 7/2001 | Pillar et al. |
| 6,301,885 B1 | 10/2001 | Johnson et al. |
| 6,457,546 B1 | 10/2002 | Ishimaru et al. |
| 6,643,959 B2 | 11/2003 | Jolliff et al. |
| 6,651,529 B1 | 11/2003 | Poplawsli et al. |
| 6,957,531 B1 | 10/2005 | Phanco et al. |
| 6,983,815 B2 | 1/2006 | Abend et al. |
| 6,986,406 B1 | 1/2006 | Hauser et al. |
| 7,036,311 B2 | 5/2006 | Hauser et al. |
| 7,040,092 B1 | 5/2006 | Buescher |
| 7,059,991 B2 | 6/2006 | Puiu |
| 7,073,330 B1 | 7/2006 | Hauser |
| 7,077,778 B1 | 7/2006 | Irikura |
| 7,089,824 B2 | 8/2006 | Nakatani et al. |
| 7,137,250 B1 | 11/2006 | McCoy et al. |
| 7,222,485 B2 | 5/2007 | Shibata et al. |
| 7,225,704 B2 | 6/2007 | Ishii et al. |
| 7,338,403 B2 | 3/2008 | Puiu |
| 7,357,750 B2 | 4/2008 | Okada |
| 7,367,353 B1 | 5/2008 | Langenfeld et al. |
| 7,455,130 B2 | 11/2008 | Irikura |
| 7,487,608 B2 | 2/2009 | Yamazaki et al. |
| 7,493,711 B2 | 2/2009 | Gautreau et al. |
| 7,497,082 B1 | 3/2009 | Bennett et al. |
| 7,503,172 B2 | 3/2009 | Sakakura et al. |
| 7,540,102 B2 | 6/2009 | Olmr et al. |
| 7,577,507 B2 | 8/2009 | Morris |
| 7,788,919 B2 | 9/2010 | Ohashi et al. |
| 7,841,176 B1 | 11/2010 | Langenfeld et al. |
| 7,913,799 B2 | 3/2011 | Kawashiri et al. |
| 7,926,624 B1 | 4/2011 | Taylor |
| 7,927,245 B1 | 4/2011 | Langenfeld et al. |
| 7,988,582 B1 | 8/2011 | Hauser |
| 8,046,992 B2 | 11/2011 | Abend et al. |
| 8,161,834 B2 | 4/2012 | Steffens |
| 8,251,868 B2 | 8/2012 | Ichikawa et al. |
| 8,313,405 B2 | 11/2012 | Bazyn et al. |
| 8,313,407 B2 | 11/2012 | Ekonen et al. |
| 8,313,408 B2 | 11/2012 | Langenfeld |
| 8,393,236 B1 | 3/2013 | Hauser et al. |
| 8,443,598 B1 | 5/2013 | Hauser et al. |
| 8,464,610 B1 | 6/2013 | Langenfeld et al. |
| 8,479,503 B2 | 7/2013 | Abend et al. |
| 8,534,060 B1 | 9/2013 | Bennett et al. |
| 8,689,551 B1 | 4/2014 | Phanco et al. |
| 8,739,905 B1 | 6/2014 | Bennett |
| 9,003,902 B1 * | 4/2015 | Bennett .............. B60K 17/28 180/364 |
| 2007/0209456 A1 | 9/2007 | Irikura et al. |
| 2008/0018267 A1 | 1/2008 | Arakawa et al. |
| 2008/0018269 A1 | 1/2008 | Wyatt et al. |
| 2008/0041048 A1 | 2/2008 | Kanenobu et al. |
| 2010/0147097 A1 | 6/2010 | Kim et al. |
| 2012/0297757 A1 | 11/2012 | Kamikawa |

* cited by examiner

DRIVE ASSEMBLY

CROSS-REFERENCE

This application is a continuation of U.S. application Ser. No. 14/290,645, filed on May 29, 2014, now U.S. Pat. No. 9,003,902, which was a divisional of U.S. application Ser. No. 12/853,978 filed on Aug. 10, 2010, now U.S. Pat. No. 8,739,905, which claims the benefit of U.S. Provisional Patent Application No. 61/232,616 filed on Aug. 10, 2009. These prior applications are incorporated herein in their entirety.

BACKGROUND OF THE INVENTION

This invention relates to a drive assembly for use in driving, for example, a snow thrower including an auger.

SUMMARY OF THE INVENTION

An improved drive assembly is disclosed herein, including a variable speed transmission and a pair of clutch assembles to separately power a pair of drive axles, in combination with a power take off ("PTO") drive for powering, for example, an auger. The drive assembly provided herein thereby allows for a lighter and more compact unit.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
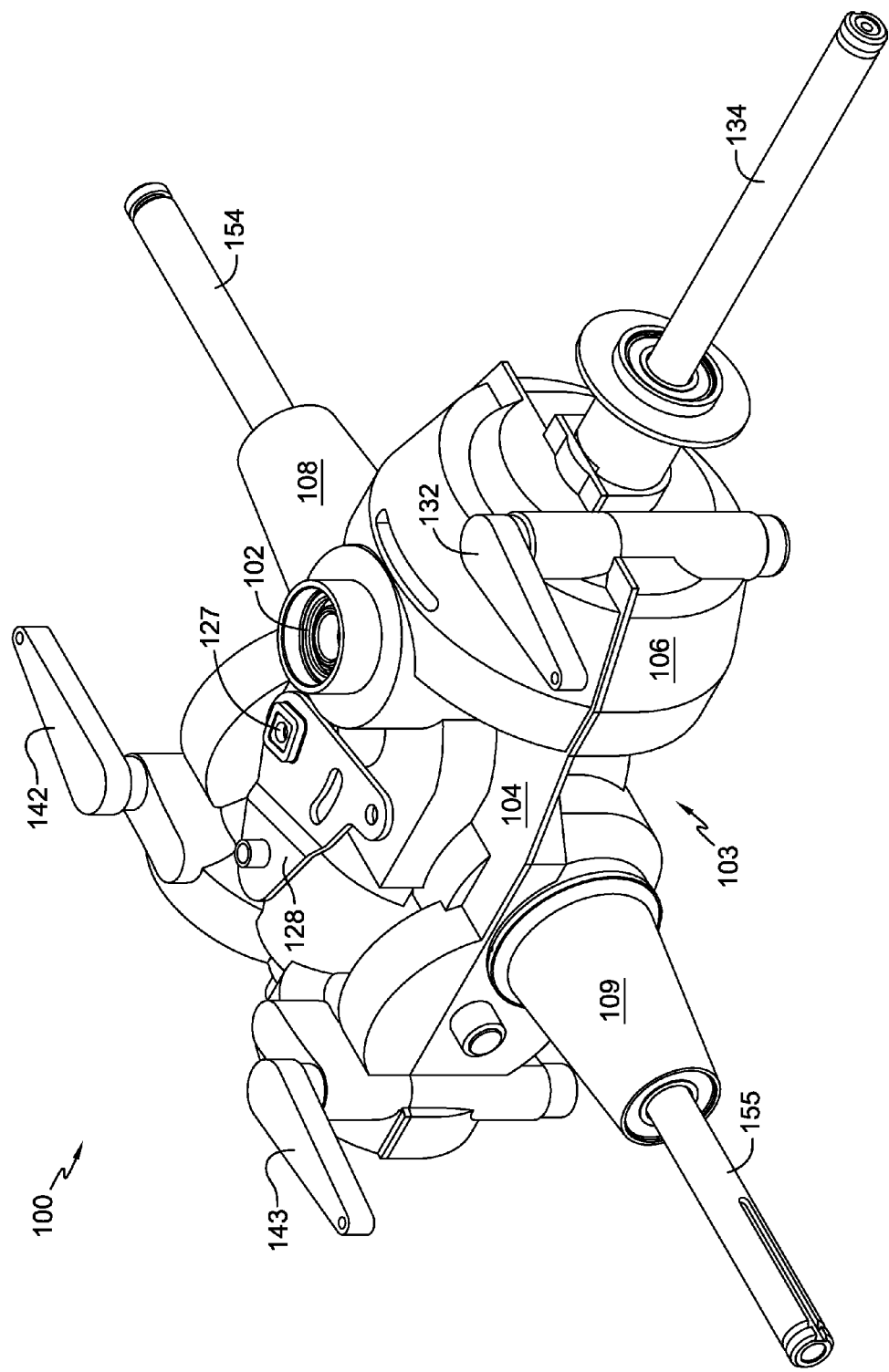
FIG. 1 is a perspective view of a drive assembly in accordance with the present invention.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a clearer description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art.

Drive assembly 100 as shown in FIGS. 1-7 includes an external housing 103 comprising two housing elements 104, 106 joined along a split line that is generally parallel to the longitudinal axes of axle shafts 154 and 155, pump input shaft 116, motor shaft 136, and PTO output shaft 134. The details of drive assembly 100 are more clearly shown in FIG. 2, which is a top plan view of the unit with housing element 104 removed. The depicted embodiment shows a variable speed transmission in the form of a hydraulic transmission disposed in sump 110 formed in housing 103. However, it will be appreciated by those in the art that the scope of the present invention includes those embodiments in which the variable speed transmission comprises other types, including but not limited to toroidal, friction and gear drives.

Drive assembly 100 is configured to directly receive a vertical output shaft (not shown) from a prime mover (not shown), such as an internal combustion engine, electric motor or the like. The vertical output shaft (not shown) engages and drives an input shaft 112. As depicted, for example, in FIG. 6, input shaft 112 is integrally formed with bevel gear 112a of drive assembly 100. However, bevel gear 112a could optionally be separately formed from input shaft 112. Input shaft 112 passes through input shaft bearing 102 and is drivingly engaged by means of bevel gear 112a to bevel gear 114 mounted on pump input shaft 116, which drives a pump cylinder block 122 at a first end and provides rotational input to a clutch/brake assembly 130 at a second end.

Figure 10:
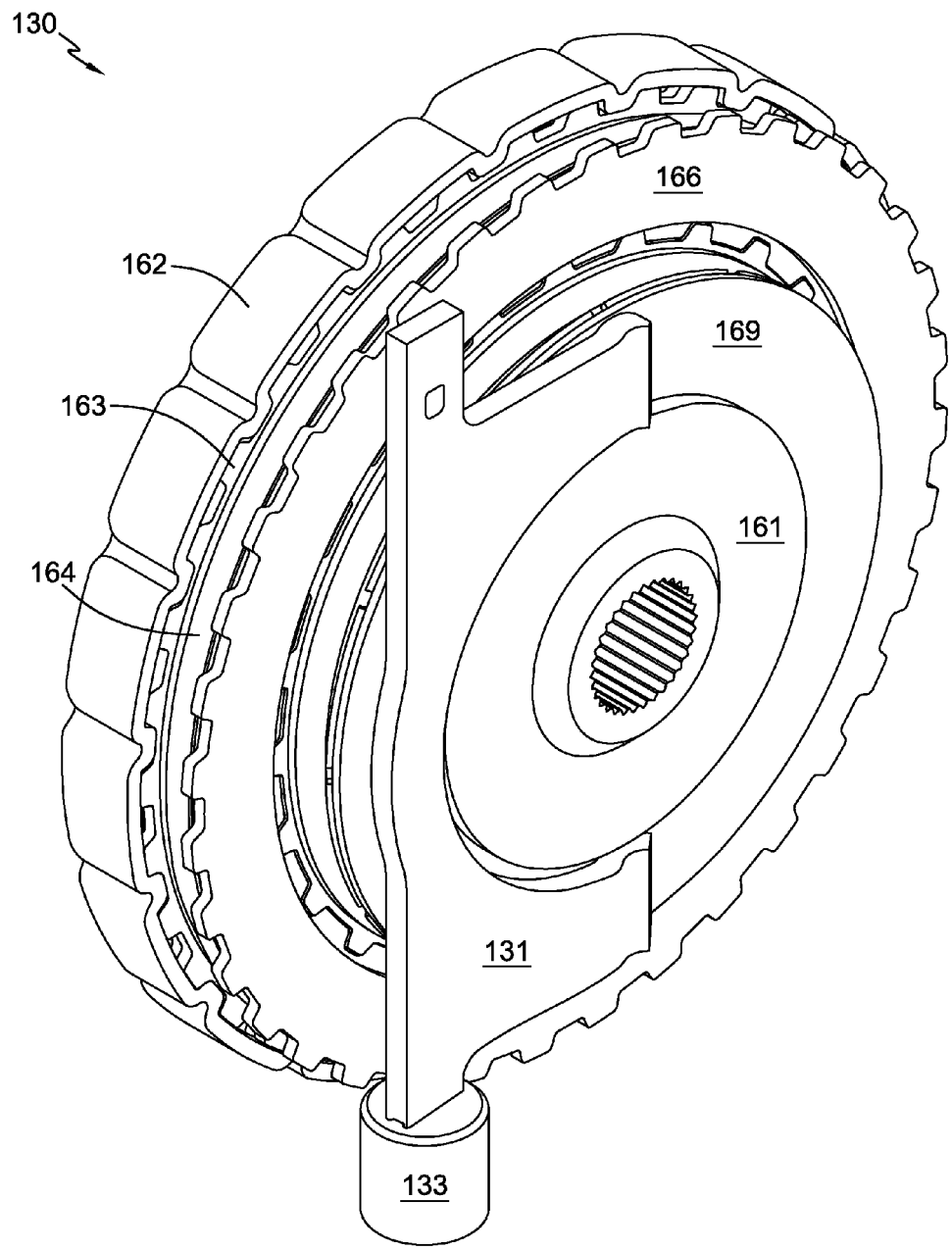
FIG. 10 is a perspective view of the PTO clutch/brake assembly shown in FIG. 2.
Figure 11:
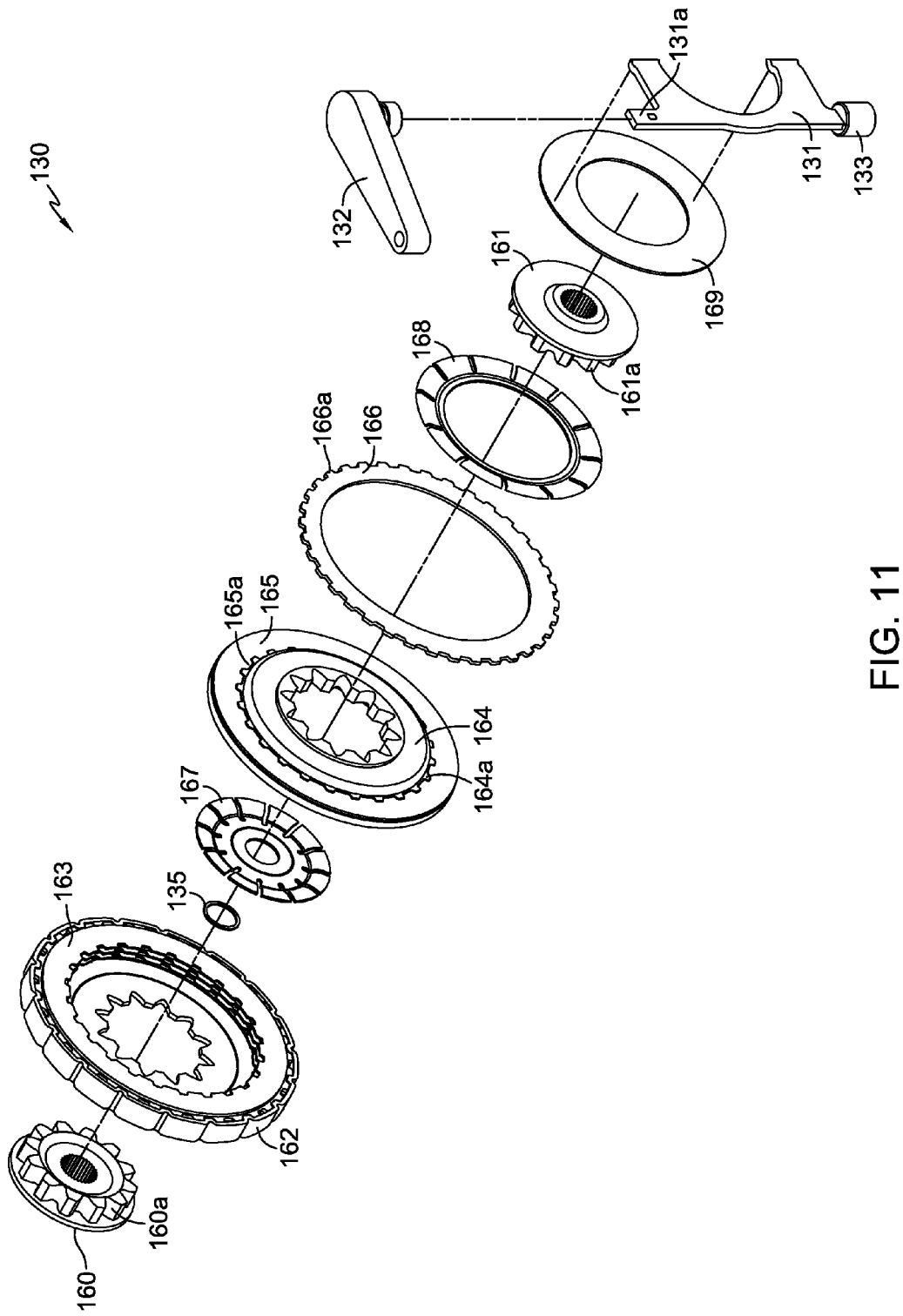
FIG. 11 is an exploded view of the PTO clutch/brake assembly shown in FIG. 10.

Clutch/brake assembly 130 regulates operation of a PTO apparatus. PTO output shaft 134 is supported by bearings 118 in housing 103 and engages the clutch and brake mechanisms of clutch/brake assembly 130 by means of output hub 161, which is fixed on PTO output shaft 134. Clutch/brake assembly 130 is shown in greater detail in FIGS. 10 and 11 as a wet mechanical clutch having clutch actuation fork 131 with projection 131a to engage PTO actuation arm 132. A similar projection (not shown) at the opposite end of clutch actuation fork 131 engages a pivot end 133, which is rotationally supported by a pocket (not shown) in housing element 106.

The depicted clutch/brake assembly 130 is designed so that the PTO output shaft 134 is normally biased to a braked state until actuation arm 132 is rotated. Brake stator 166 has teeth 166a formed on its outer periphery that mate with corresponding indentations or projections in housing 103 (not shown). This mating prevents rotation of brake stator 166 with respect to housing 103.

Brake rotor 165 is disposed on carrier 164 and has teeth 165a on its inner periphery that mate with corresponding teeth 164a on carrier 164. Brake bias spring 167, which is retained in position by retaining ring 135, bears upon carrier 164 and serves to bias the brake rotor 165 toward frictional engagement with brake stator 166. In this manner, clutch/brake assembly 130 is biased to the braked state. Carrier 164 is mated to output hub 161 via gear form 161a, and as stated above, output hub 161 is fixed on PTO output shaft 134. Because the frictional engagement with brake stator 166 arrests rotation of carrier 164, any rotation of output hub 161, as well as PTO output shaft 134, is also arrested.

When PTO actuation arm 132 is rotated, clutch actuation fork 131 contacts and bears upon washer 169. Washer 169 in turn contacts clutch spring 168 and bears upon it. Clutch spring 168 acts to ensure that excessive force or pressure is not applied to clutch plate stack 163 by carrier 164, thereby extending the service life of the wet clutch plates. In moderating the force applied by clutch actuation fork 131, clutch spring 168 acts on carrier 164, which moves against and overcomes the bias force of brake bias spring 167 and bears upon clutch plate stack 163. By this action, PTO output shaft 134 becomes disengaged from brake stator 166, and the driving engagement of PTO output shaft 134 and cage 162 is initiated.

Clutch input hub 160 is fixed to pump input shaft 116, and is also mated to cage 162 through gear form 160a. It will be appreciated by those in the art that the mating surfaces of cage 162 and clutch input hub 160 described here as a "gear form" may take other forms such as a tooth or spline form. As such, whenever the prime mover (not shown) is supplying power to drive assembly 100, cage 162 is driven by the rotation of pump input shaft 116. Clutch plate stack 163, which is disposed within cage 162, comprises two types of clutch plates. The first type comprises a plurality of teeth forms extending from the interior periphery of the clutch plate and are engaged to carrier 164. The second type comprises a plurality of teeth forms extending from the exterior periphery of the clutch plate and are engaged to and driven by cage 162. The first type of clutch plates are alternately disposed between the second type of clutch plates. When clutch actuation fork 131 rotates, the movement of carrier 164 under the influence of clutch actuation fork 131 brings the first type of clutch plates into frictional engagement with the second type of clutch plates, which causes the first type of clutch plates to rotate with cage 162 through the second type of clutch plates, transferring rotation and torque from cage 162 to PTO output shaft 134. Clutches of other design, e.g. other mechanical clutches, electrical clutches, or hydraulic clutches (not shown), may alternatively be used.

PTO output shaft 134 can be used to drive an implement such as a snow thrower auger (not shown) and blower (not shown). The layout of the present design permits PTO output shaft 134 to be collinear with pump input shaft 116 and motor output shaft 136, thereby permitting a particularly low profile unit. The mounting of clutch/brake assembly 130 and PTO output shaft 134 in a common housing 103 with the drive elements of drive assembly 100 also minimizes the overall size of the unit.

The drive portion of drive assembly 100 comprises a variable speed transmission which, in the depicted embodiment, is a hydrostatic transmission. A transaxle incorporating a hydrostatic transmission and design used in a snow thrower is shown in commonly-owned U.S. Pat. No. 6,651,529, the terms of which are incorporated herein by reference.

In the depicted embodiment, center section 120 is disposed in housing 103. Pump cylinder block 122 and motor cylinder block 124 are disposed on center section 120 and are hydraulically connected to one another through porting formed in center section 120. As noted, pump input shaft 116 is engaged to and driven by bevel gear 114, and pump input shaft 116 is engaged to and drives pump cylinder block 122. Pump input shaft 116 is supported by center section 120 at one end and by bearing 119 proximate to its other end. Pump cylinder block 122, motor cylinder block 124 and their accompanying pistons can be of a standard design for an axial piston hydrostatic transmission, as is shown in commonly-owned U.S. Pat. No. 6,651,529. A rotatable swash plate 126 controlled by integrally formed trunnion 127 and external control arm 128 operate to control the output of the hydrostatic transmission as is known in the art.

Figure 8:
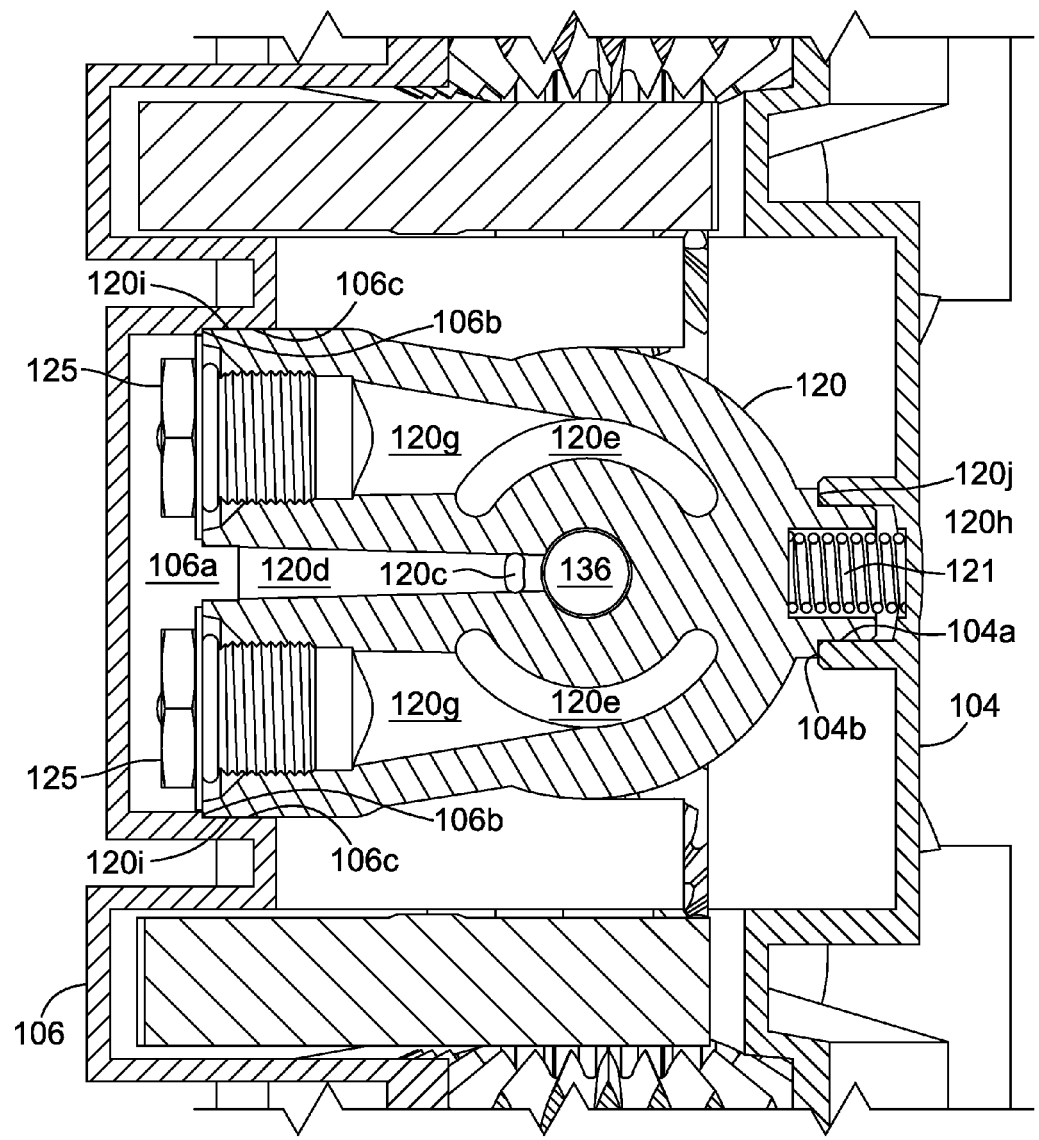
FIG. 8 is a cross-sectional view of the drive assembly along the line 8-8 in FIG. 7.
Figure 9:
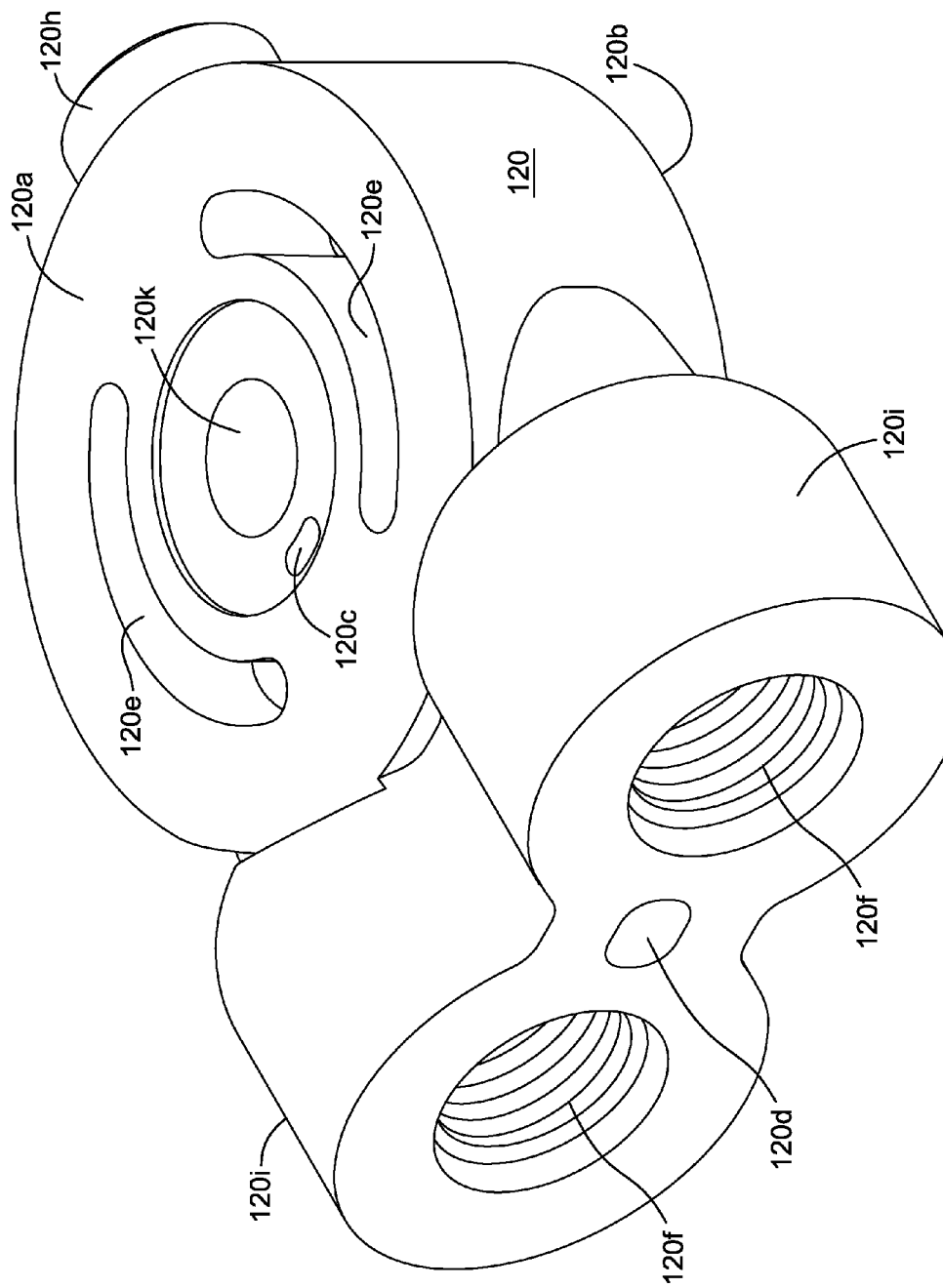
FIG. 9 is a perspective view of the center section of the drive assembly of FIG. 1.

Center section 120 is shown in greater detail in FIGS. 8 and 9. Center section 120 has pump running surface 120a on which pump cylinder block 122 is disposed. Kidney through-ports 120e permit passage of hydraulic fluid through center section 120 to motor running surface 120b and motor cylinder block 124 disposed thereon to complete a hydraulic circuit. Block drain 120c allows passage of hydraulic fluid into common block drain and shafts lubrication passage 120d, simultaneously preventing block lift of the pump cylinder block 122 and motor cylinder block 124, while providing additional lubrication to pump input shaft 116 and motor output shaft 136. Check plugs 125 are disposed in check plug ports 120f to regulate flow through check plug passages 120g. Shaft-support opening 120k, which serves as a bearing surface, extends through center section 120 to receive both pump input shaft 116 and motor output shaft 136.

Center section 120, which does not use fasteners to secure its position in housing 103, has several features which maintain its proper positioning. These features are located in both housing elements 104 and 106, and work in concert to trap center section 120 between them. During assembly of drive assembly 100, center section 120 is inserted into pocket 106a formed in housing 106 and abuts locator stops 106b. In proximity to check plug passages 120f are alignment profiles 120i, which interface with mating alignment profiles 106c formed in pocket 106a to locate and restrain center section 120. On the opposing end of center section 120 is located protrusion 120h, which is inserted into pocket 104a of housing 104 to further locate and restrain center section 120. Locator stop 120j, formed adjacent to protrusion 120h, abuts against outer abutment surface 104b of pocket 104a to further locate and restrain center section 120. Protrusion 120h prevents rotation of center-section 120 that would be caused by rotational forces imparted by the rotation of pump input shaft 116 and motor output shaft 136 because of their contact with center section 120. Vibration dampening spring 121, which is optional, bears on center section 120 and can be included to dampen any vibration caused by operation of drive assembly 100.

Figure 2:
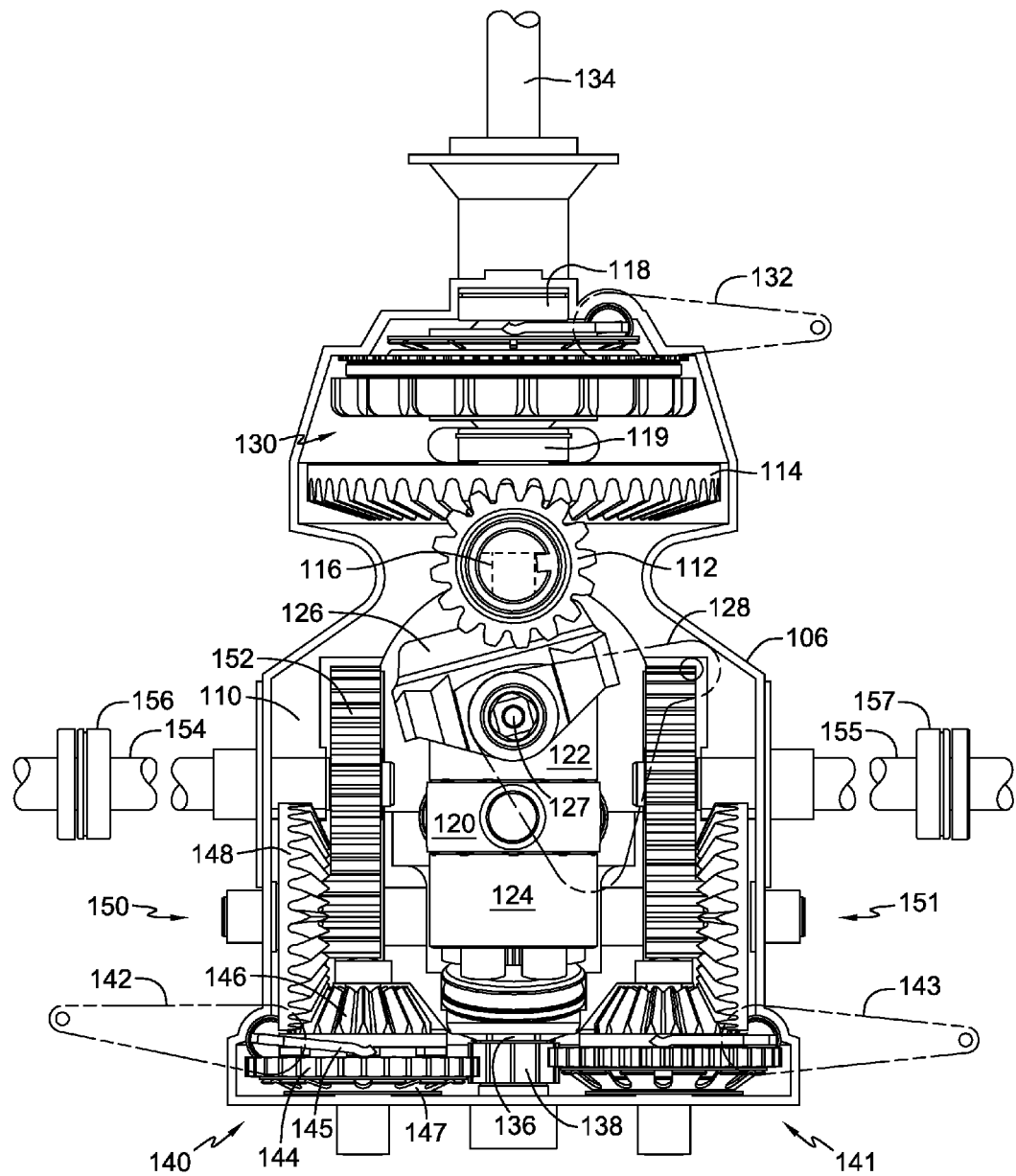
FIG. 2 is a top plan view of the drive assembly of FIG. 1, with one housing element removed.
Figure 3:
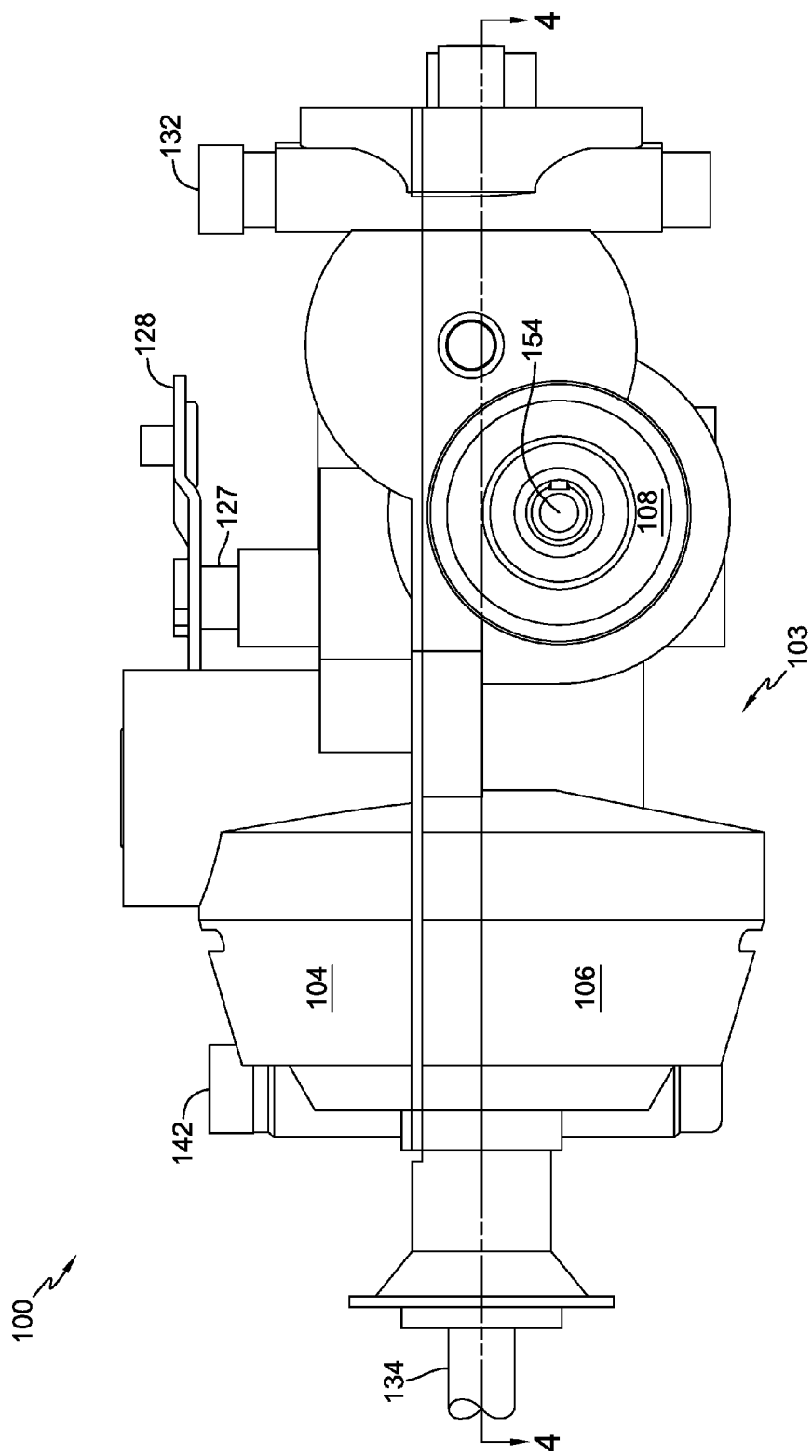
FIG. 3 is a side elevational view of the drive assembly of FIG. 1.
Figure 4:
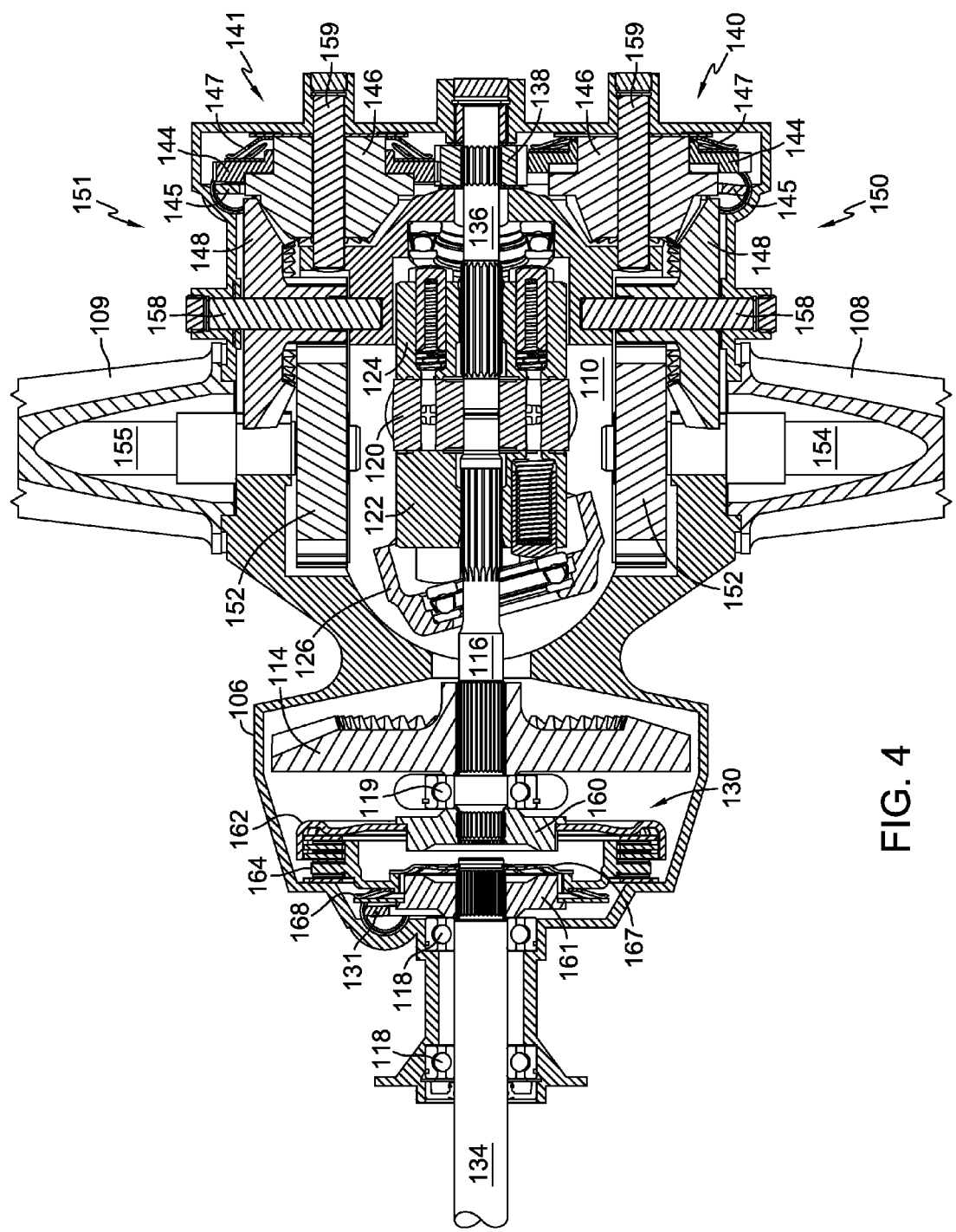
FIG. 4 is a cross-sectional view of the drive assembly along the line 4-4 in FIG. 3.
Figure 5:
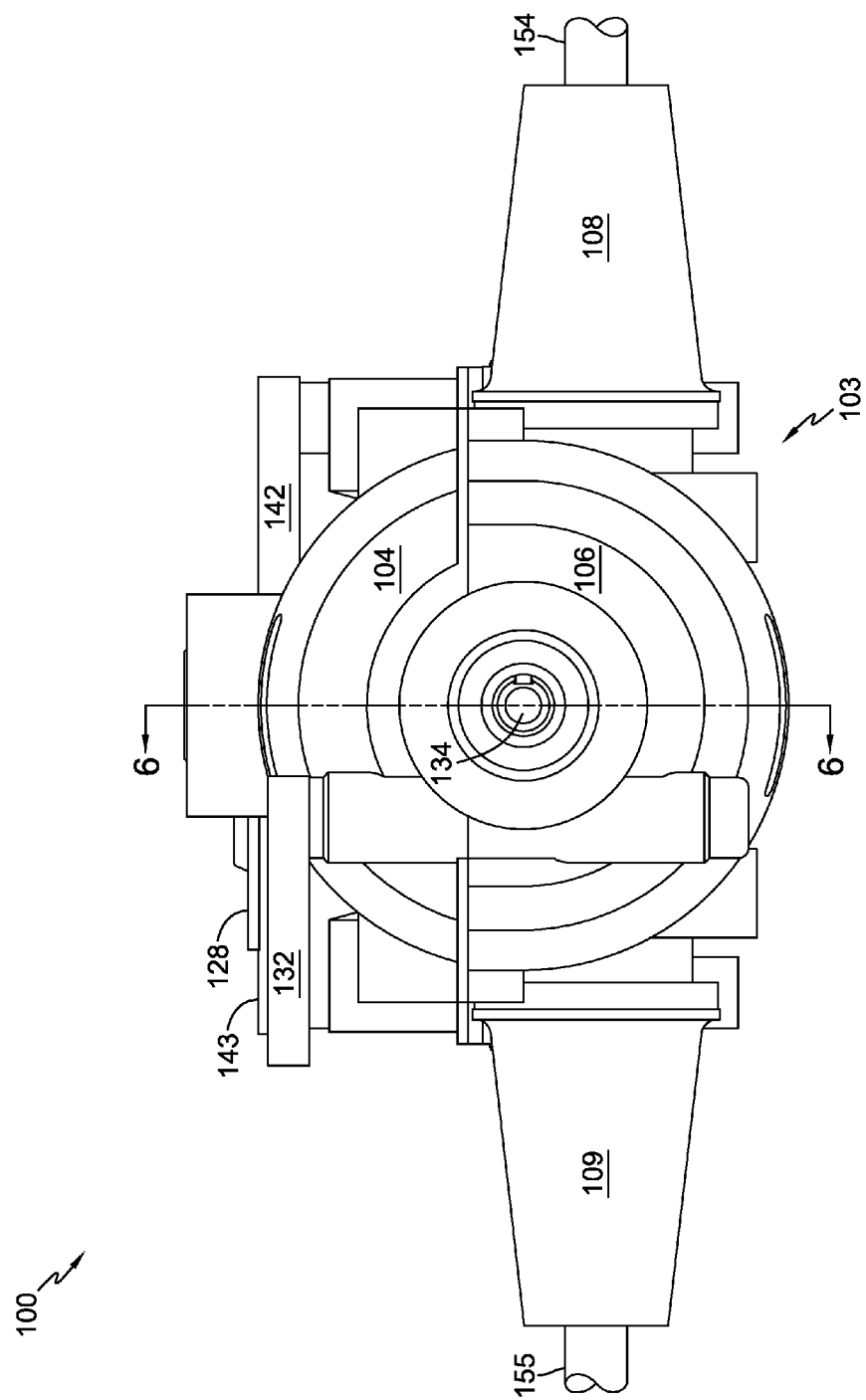
FIG. 5 is a front elevational view of the drive assembly of FIG. 1.
Figure 6:
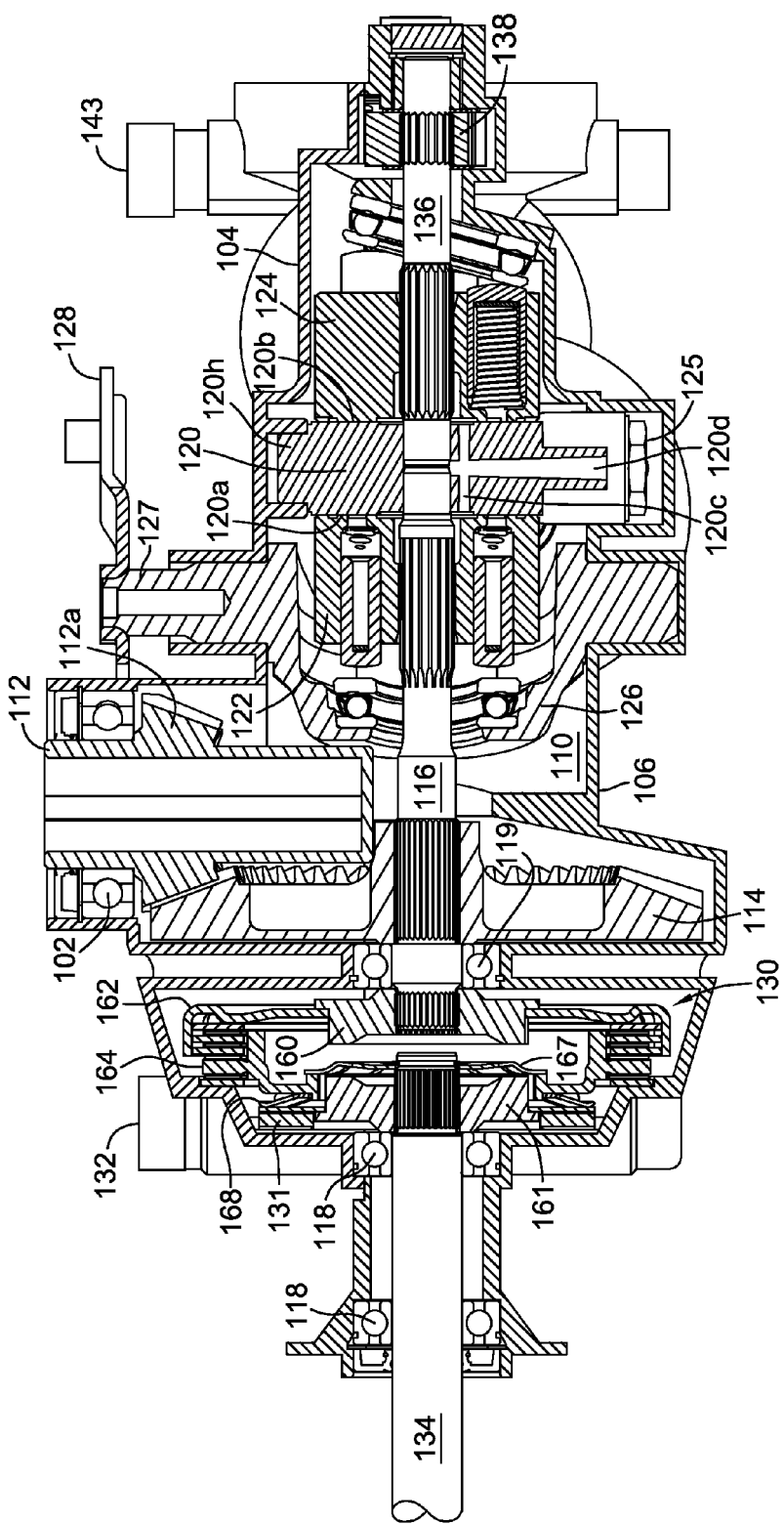
FIG. 6 is a cross-sectional view of the drive assembly along the line 6-6 in FIG. 5.

As illustrated in FIGS. 2, 4 and 6, motor cylinder block 124 is engaged to and drives motor output shaft 136. Motor output shaft 136 is supported by center section 120 and by a bearing in housing 106. A pinion spur gear 138 is disposed on motor output shaft 136 and is engaged to and drives a pair of input spur gears 144 which are part of the clutch assembles 140 and 141. This gear combination may serve as a first reduction stage, depending on the scaling of the respective gears for a given application.

For the sake of simplicity, only the left side clutch assembly 140, gear train 150 and axle 154 will be described in detail herein. The right side clutch assembly 141, including gear train 151 and axle 155, can be substantially identical in form and function.

Gear train 150 comprises spur and bevel combination gear 148 engaged to and driving spur gear 152, which is fixed to axle shaft 154. This gear combination may serve as a final reduction stage. When the clutch assembly 140 is engaged, output bevel gear 146 drives spur and bevel combination gear 148, providing a gear reduction. Gear 148 in turn is engaged to and drives a spur gear 152 fixed to axle shaft 154. Jack shafts 158 and 159, which rotationally support spur and bevel combination gear 148 and output bevel gear 146 respectively, are inserted into housing element 106 through various plugged openings visible in FIGS. 1 and 4 to facilitate assembly.

Figure 7:
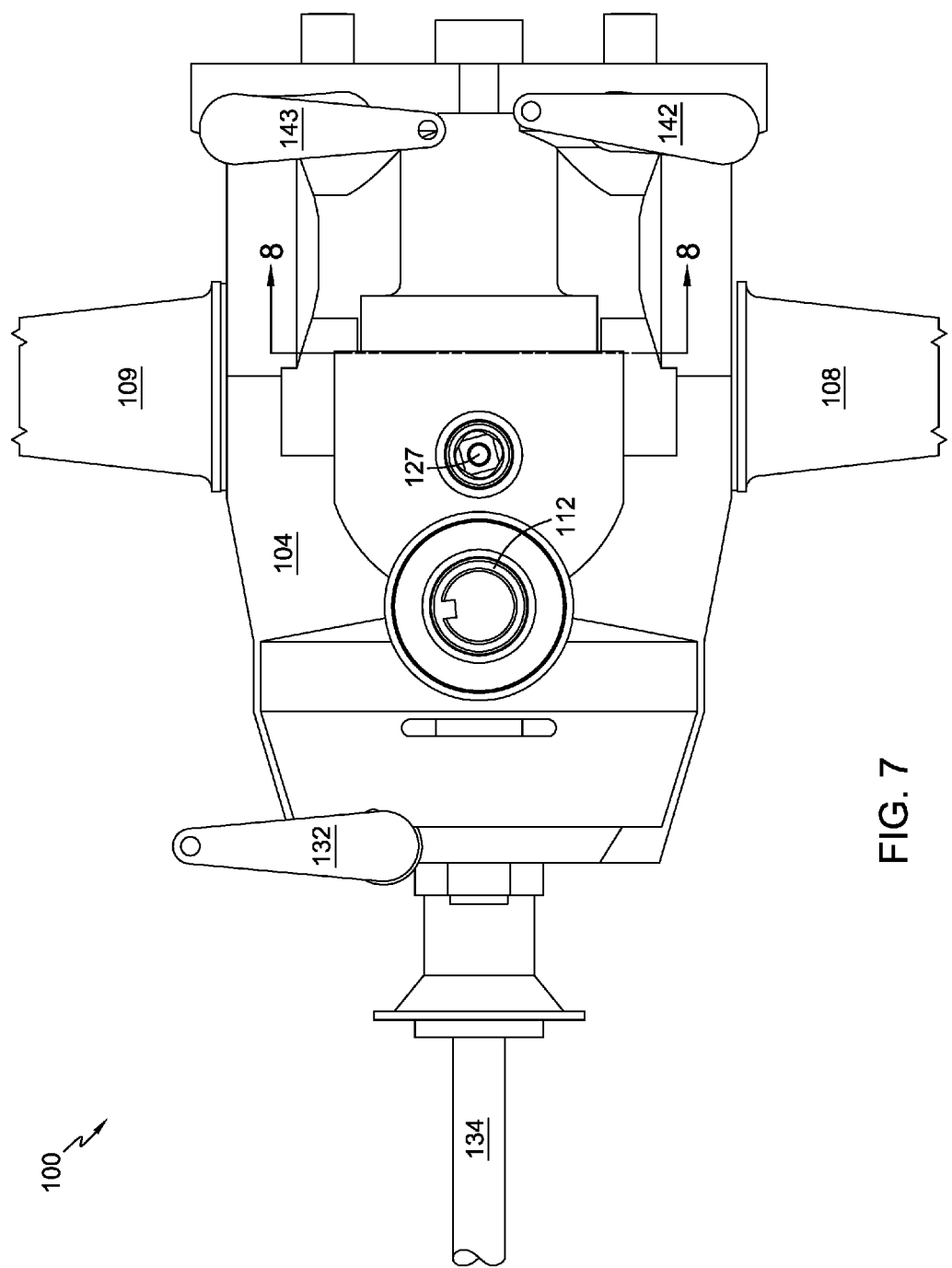
FIG. 7 is a top plan view of the drive assembly of FIG. 1.
Figure 12:
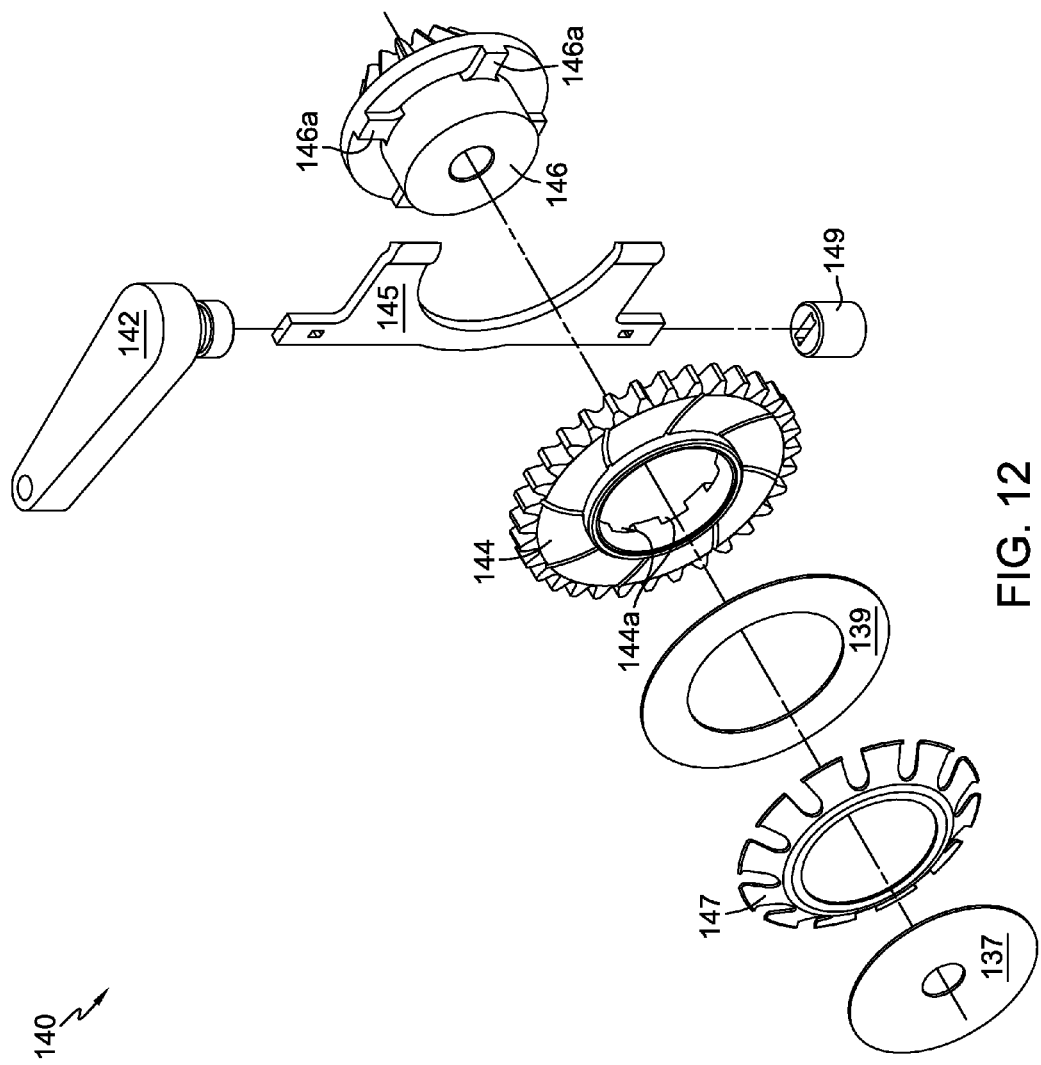
FIG. 12 is an exploded view of one of the clutch assemblies that transfers power from the transmission to the gear train of the drive assembly.

Unlike the PTO clutch/brake assembly 130 previously detailed, clutch assembly 140 is normally biased to an engaged state. Clutch assembly 140, however, is depicted in a disengaged state in FIGS. 2 and 4 via rotation of clutch actuation arm 142. It should be noted in these same figures that clutch assembly 141 is depicted in an engaged state. Clutch actuation arm 142 may be connected to an actuator fork 145 in various orientations as required by the application. A comparison of the relative positions of clutch actuation arm 142 in FIGS. 2 and 7 illustrates this principle. As previously noted with clutch actuation fork 131, the opposite end of clutch actuator fork 145 engages a pivot end 149, which is rotationally supported by a pocket (not shown) in housing element 106. Upon rotation of clutch actuation arm 142, actuator fork 145 pushes input spur gear 144 against washer 139 and disc spring 147 to compress the spring. A thrust washer 137 resides on the opposite side of disc spring 147 to protect the components of clutch assembly 140 and housing element 106. This movement of input spur gear 144 away from output bevel gear 146 disengages projections 146a (as best shown in FIG. 12) on the backside of output bevel gear 146 from corresponding indentations 144a in the face of the input spur gear 144 that contacts actuator fork 145, effectively disengaging gear train 150 from motor output shaft 136. In an application such as a snow thrower, clutch actuation arms 142 and 143 can be engaged to linkages (not shown) to permit the user to separately and selectively control the input to the two axles 154, 155 of drive assembly 100, thereby driving and steering the application.

Axle shaft 154 is supported in axle bearing 156 disposed external to housing 103 and on a separate bearing in housing 103, so that an internal end of axle shaft 154 is disposed adjacent to the hydrostatic transmission. Similarly, an internal end of axle shaft 155 is disposed adjacent to an opposite side of the hydrostatic transmission, thereby reducing the overall size of the unit. An external end of axle shaft 154 extends from axle horn 108.

It will be understood that various internal bearings, seals, fasteners and related hardware are not depicted in the figures or are depicted but not described herein, but the operation and applicability of such hardware is known to a person of skill in the art. Furthermore, while specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A drive assembly, comprising:
   a housing comprising a plurality of housing members having a plurality of internal walls which form a sump;
   a center section supported by the plurality of housing members without separate fasteners, the center section comprising at least one running surface for a rotating cylinder block and internal hydraulic porting;
   a spring disposed between and contacting both the center section and one of the internal walls of the housing.

2. The drive assembly of claim 1, further comprising a first protrusion extending from one end of the center section and a second protrusion extending from a second end of the center section, and wherein the plurality of internal walls comprise at least a first wall surface and a second wall surface, the first wall surface having a first pocket formed therein and supporting the first protrusion, and the second wall surface having a second pocket formed therein and supporting the second protrusion, and the center section is fully supported by the interaction of the first pocket and the first protrusion and the interaction of the second pocket and the second protrusion.

3. The drive assembly of claim 1, wherein at least a portion of the spring is located in an opening formed in the first protrusion.

4. The drive assembly of claim 1, further comprising a protrusion extending from the center section and engaged to the one internal wall.

5. A drive assembly, comprising:
   a housing comprising an internal wall;
   a center section disposed in the housing, the center section comprising at least one running surface for a rotating cylinder block and internal hydraulic porting;
   a spring disposed between the center section and the internal wall of the housing; and
   a protrusion formed on the center section and engaged to the internal wall, wherein at least a portion of the spring is located in an opening formed in the protrusion.

6. A drive assembly, comprising:
   a housing comprising an internal wall;
   a center section disposed in the housing, wherein the center section comprises a first running surface for a first rotating cylinder block and a second running surface for a second rotating cylinder block and the first running surface and the second running surface are formed on opposite sides of the center section such that the first rotating cylinder block has a first axis of rotation that is parallel to a second axis of rotation of the second rotating cylinder block; and
   a spring disposed between the center section and the internal wall of the housing.

7. The drive assembly of claim 6, wherein the first rotating cylinder block is a hydraulic pump driven by a pump input shaft and the second rotating cylinder block is a hydraulic motor engaged to and driving a motor shaft, and the pump input shaft and the motor shaft have a coaxial axis of rotation.

8. The drive assembly of claim 7, further comprising a first protrusion formed on the center section and engaged to the internal wall, wherein at least a portion of the spring is located in an opening formed in the first protrusion.

9. The drive assembly of claim 8, wherein the center section further comprises a side wall extending between the first running surface and the second running surface, and the first protrusion extends from the side wall at a first end of the center section.

10. The drive assembly of claim 9, wherein the internal wall comprises at least a first wall surface and a second wall surface, the first wall surface having a first pocket formed therein and supporting the first protrusion, and the second wall surface having a second pocket formed therein; wherein the center section comprises a second protrusion extending from a second end of the side wall, opposite to the first end, and extending into and supported by the second pocket.

11. The drive assembly of claim 10, wherein the center section is fully supported by the interaction of the first pocket and the first protrusion and the interaction of the second pocket and the second protrusion.

12. A drive assembly, comprising:
 a housing comprising a plurality of internal walls which form a sump, a first pocket formed on one of the plurality of internal walls and a second pocket formed on another of the plurality of internal walls;
 a center section disposed in the sump and comprising:
  a main body comprising a first running surface and a second running surface formed thereon, and at least one side wall;
  internal porting formed in the main body to connect the first running surface with the second running surface; and
  a pair of passages formed in a structure having an external surface forming an alignment profile and extending from the at least one side wall, wherein the pair of passages are in communication with the internal porting; and
  a protrusion extending from the at least one side wall of the main body generally opposite to the structure, wherein the alignment profile is shaped to fit in the first pocket and the protrusion is shaped to fit in the second pocket and the center section is fully supported by the interaction of the first pocket and the alignment profile and the interaction of the second pocket and the protrusion; and
 a hydraulic pump rotatably disposed on the first running surface and a hydraulic motor rotatably disposed on the second running surface.

13. The drive assembly of claim 12, further comprising a spring disposed between and engaged to the center section and one of the plurality of internal walls of the housing.

14. The drive assembly of claim 13, wherein the spring is engaged to the protrusion on the center section.

15. The drive assembly of claim 14, further comprising a locator stop formed adjacent to the protrusion to further engage the first pocket and assist in locating the center section.

16. The drive assembly of claim 14, wherein the protrusion comprises an opening formed therein, and at least a portion of the spring is disposed in the opening.

17. The drive assembly of claim 12, further comprising a block drain formed in the center section and in communication with a lubrication and drain passage formed in the center section, wherein the lubrication and drain passage communicates with the sump.

18. The drive assembly of claim 17, wherein the lubrication and drain passage extends parallel to the pair of passages.

19. The drive assembly of claim 18, wherein the block drain opens to both the first running surface and the second running surface.

20. The drive assembly of claim 12, wherein the housing further comprises a first housing member in which the first pocket is located and a second housing member in which the second pocket is located, wherein the first housing member is secured to the second housing member to form the sump along a split line that is perpendicular to the first running surface and the second running surface.

21. A drive assembly, comprising:
 a housing comprising a plurality of internal walls which form a sump, a first pocket formed on one of the plurality of internal walls and a second pocket formed on another of the plurality of internal walls;
 a center section disposed in the sump and comprising:
  a main body having a first running surface and a second running surface formed thereon and a side wall connecting the first running surface to the second running surface;
  internal porting formed in the main body to connect the first running surface with the second running surface; and
  a porting structure connected to and extending from the side wall, the porting structure having a pair of passages formed therein and in communication with the internal porting and an alignment profile formed on an external surface of the porting structure; and
  a protrusion extending from the side wall of the main body generally opposite to the porting structure, wherein the protrusion is shaped to fit in the first pocket and the alignment profile is shaped to fit in the second pocket and the center section is fully supported by the interaction of the first pocket and the protrusion and the interaction of the second pocket and the alignment profile; and
 a hydraulic pump rotatably disposed on the first running surface and a hydraulic motor rotatably disposed on the second running surface.

* * * * *

UNITED STATES PATENT AND TRADEMARK OFFICE
CERTIFICATE OF CORRECTION

| | |
|---|---|
| PATENT NO. | : 9,512,914 B1 |
| APPLICATION NO. | : 14/684034 |
| DATED | : December 6, 2016 |
| INVENTOR(S) | : Michael L. Bennett |

It is certified that error appears in the above-identified patent and that said Letters Patent is hereby corrected as shown below:

In the Claims

Column 6, Line 27, Claim 3, "claim 1" should be changed to --claim 2--.

Signed and Sealed this
Sixteenth Day of May, 2017

Michelle K. Lee
*Director of the United States Patent and Trademark Office*